Figure 7:
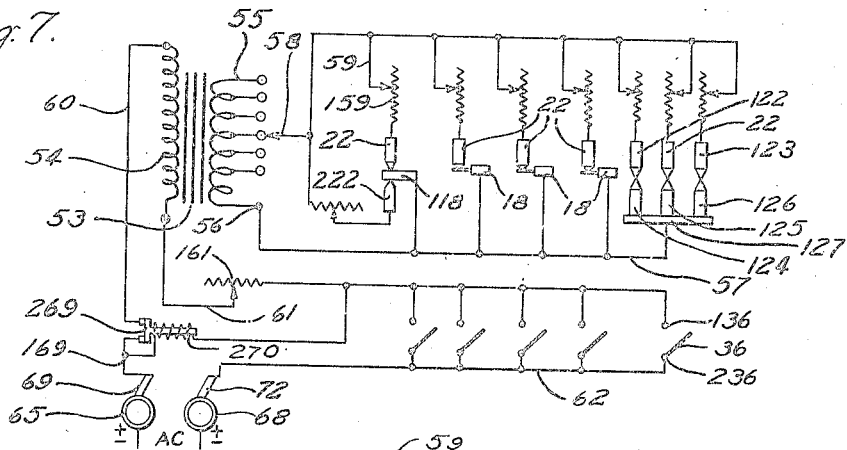

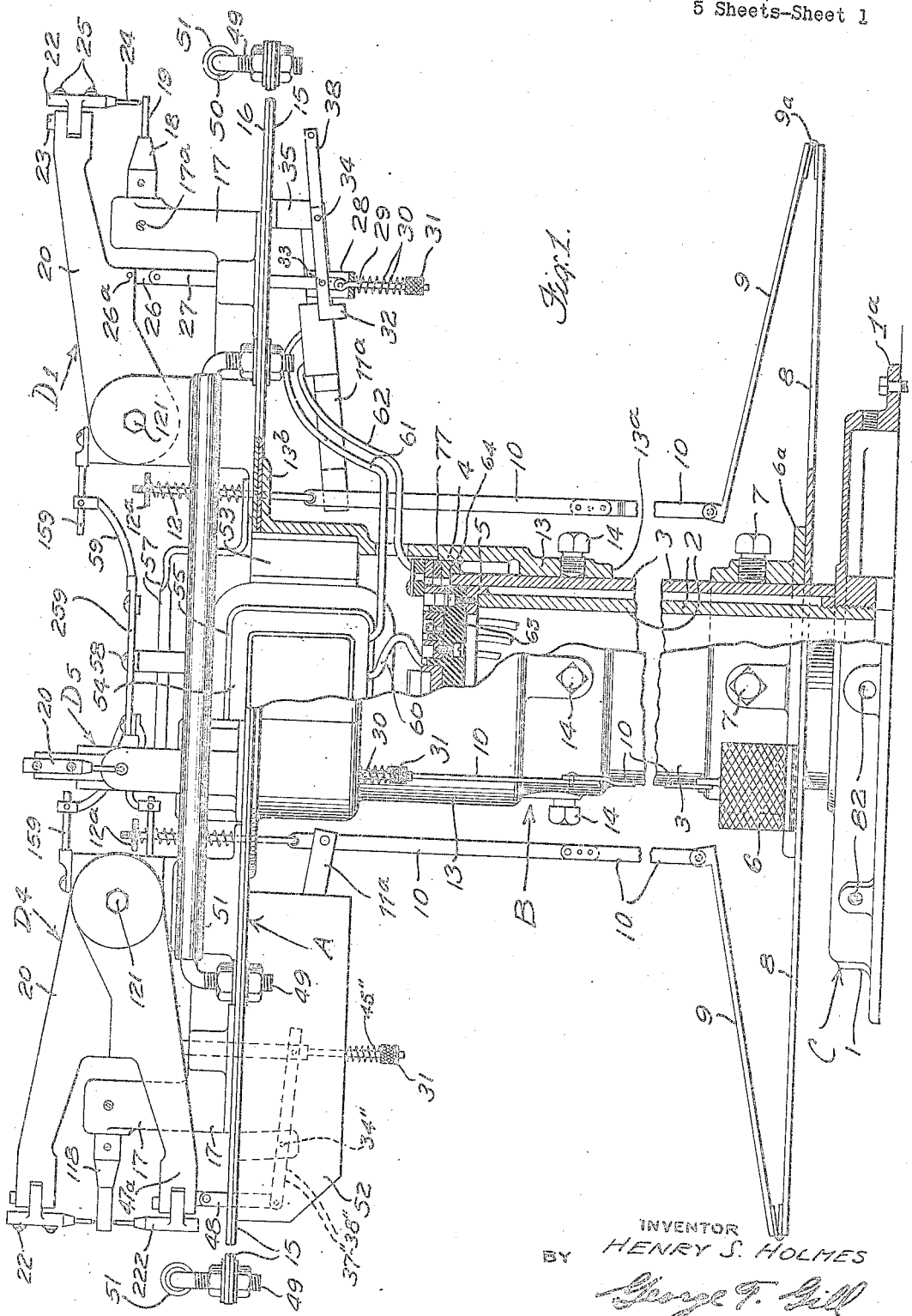

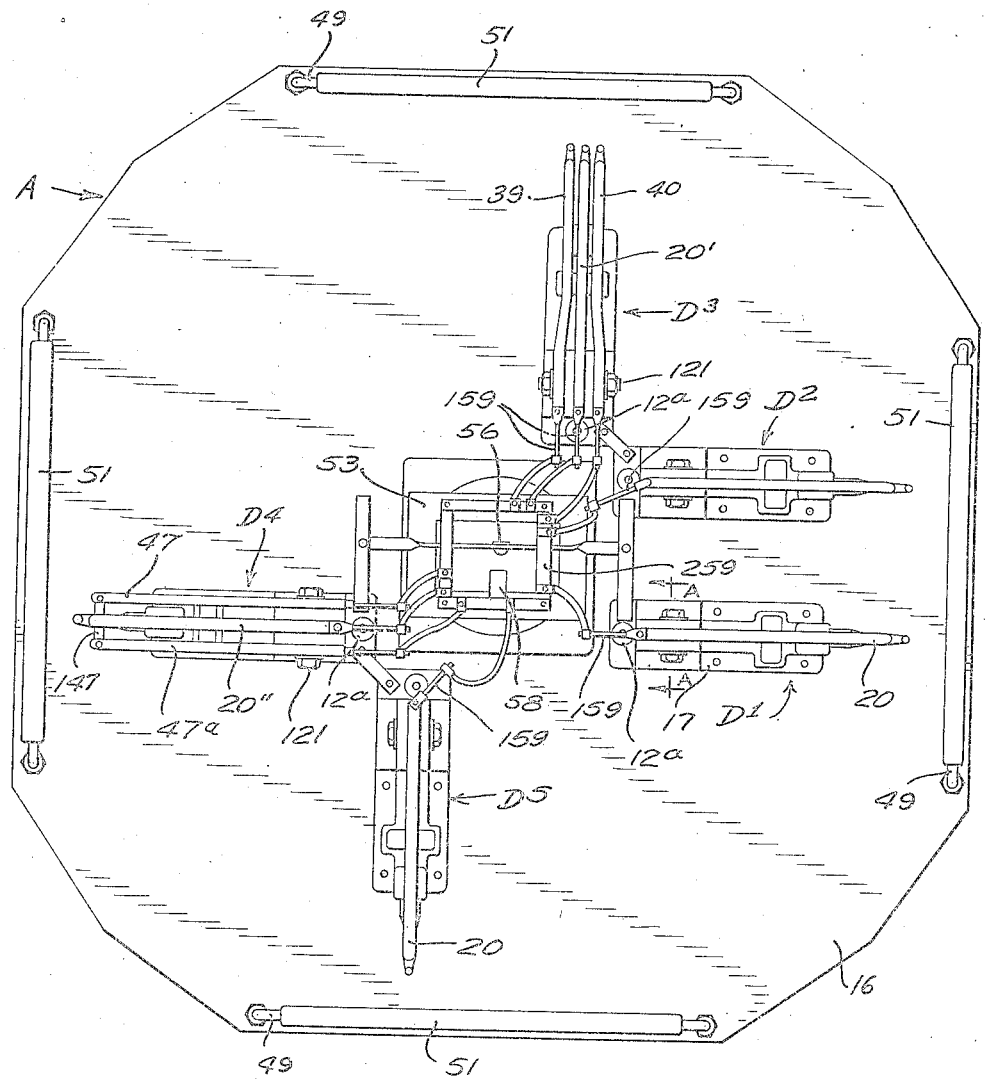

Sept. 6, 1949.   H. S. HOLMES   2,481,219
ELECTRIC WELDING
Filed April 19, 1946   5 Sheets-Sheet 3
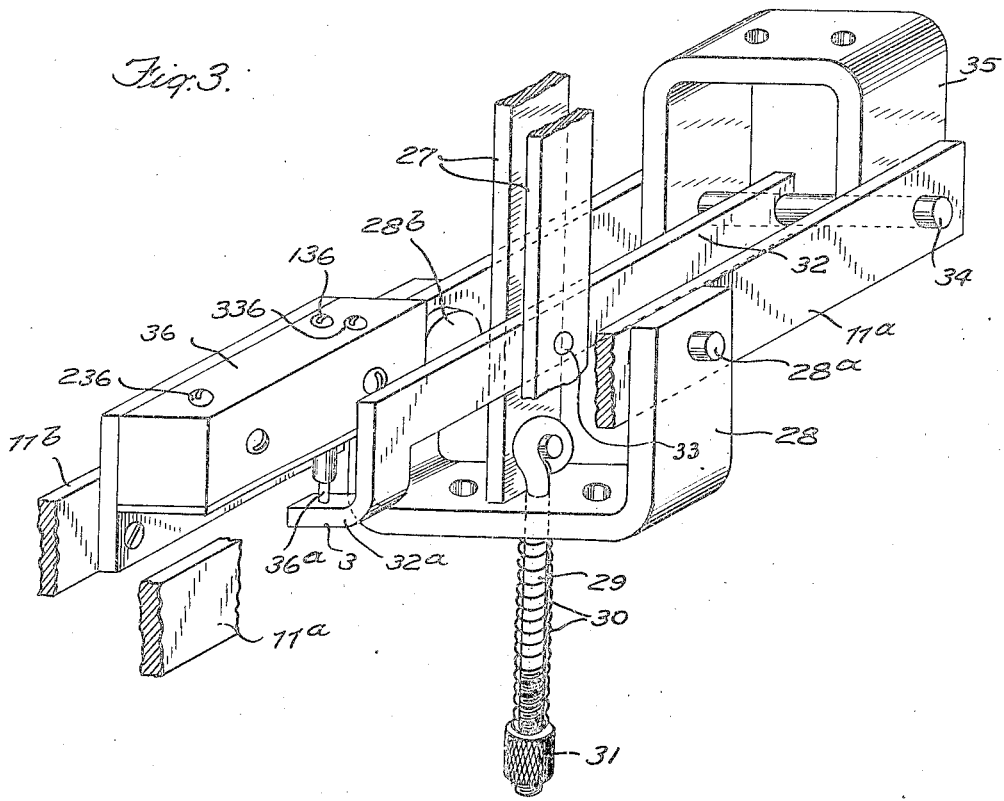
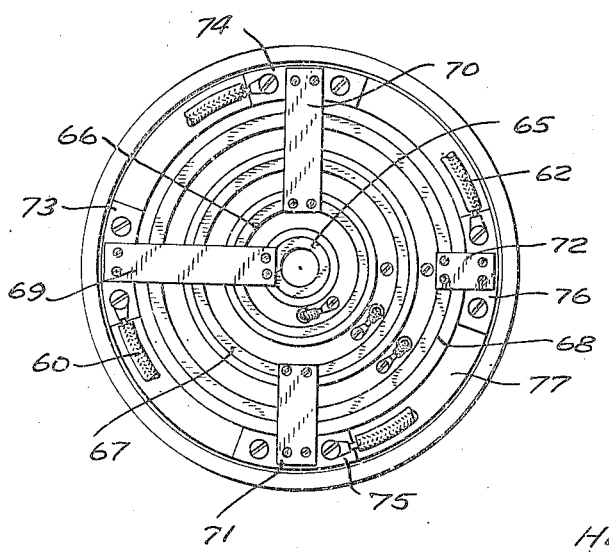
INVENTOR
HENRY S. HOLMES
BY
George F. Gill
ATTORNEY

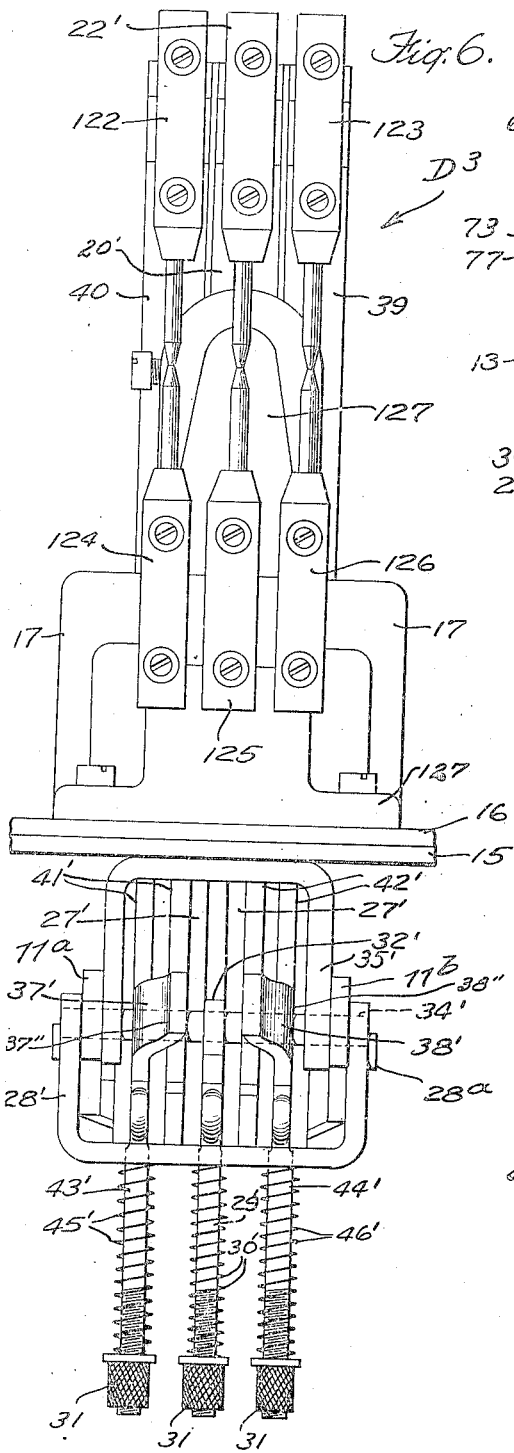
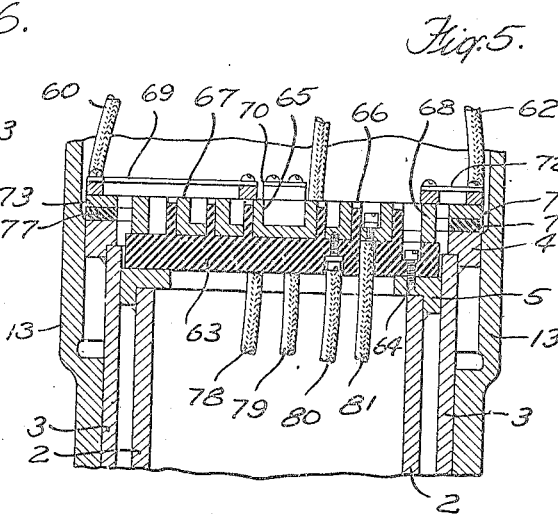
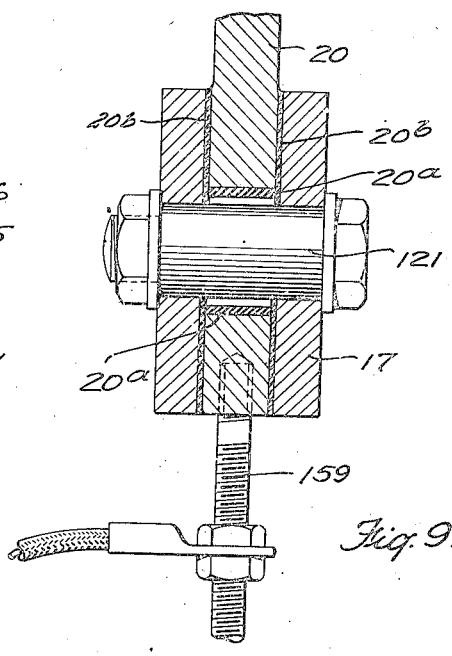
INVENTOR
HENRY S. HOLMES
BY George T. Gill
ATTORNEY

INVENTOR
HENRY S. HOLMES
BY
ATTORNEY

Patented Sept. 6, 1949

2,481,219

UNITED STATES PATENT OFFICE 2,481,219

ELECTRIC WELDING

Henry S. Holmes, Arlington, Mass., assignor to Metropolitan Engineering Company, Brooklyn, N. Y., a corporation of New York Application April 19, 1946, Serial No. 663,364

6 Claims. (Cl. 219—4)

The invention herein disclosed relates to electric welding and comprehends electric welding apparatus and a method of welding several different parts making up an article, such, for example, as an electronic tube.

The usual electronic tube consists of several different prefabricated parts, united by spot welding to the stem leads. This assemblage of parts is called a "mount." The essential parts of a "mount" may include a cathode, heater, one or more grids, a plate, getter, radiator, shield, etc. They are made of material which includes copper, steel, nickel and tungsten; and the thickness of the material varies from one thousandth of an inch to several thousandths. In order to spot weld these parts of various material and thickness, it is necessary to use several welding machines, each equipped with welding tips of special shape or material (copper, copper alloy, tungsten, carbon, etc.) and adjusted for the proper current and welding pressure required for a particular operation.

The usual procedure in the production of "mounts" is to establish a team of operators, each provided with one or two welding machines adapted for their particular operation. In this way, the "mount" passes down the line in the process of manufacture. There are many disadvantages in this method of production, some of which are as follows: The quantity of the product depends upon the speed of the slowest operator; the quality of the product depends on the ability of the poorest operator; it is impossible to arrange a "set up" wherein each operator will be working at maximum speed; if one machine needs maintenance, the entire team shuts down, since it is impossible to maintain a bank of parts between operations, because of the rapid deterioration of the component material when exposed to the atmosphere—this latter reason precludes the possibility of placing each operation on a "piece work" basis; if one operator is absent, the entire team shuts down, unless substitutes are on hand; when working on piece work or bonus, the earnings of the entire team depend upon the work of the slowest operator—this promotes labor "turnover," since the earnings of the fastest and most experienced operator is limited by the ability of the slowest worker; when producing tubes of a type for which there are only a few on order, it is often very uneconomical to set up a team for the work; and the eye strain on some of the operators in the team is much greater than on others.

By the invention herein disclosed there is provided an electric welding apparatus and method of welding component parts of an article such, for example, as a "mount" for an electronic tube, by which injurious effects of labor turnover and absenteeism are reduced; delays caused by necessary maintenance are eliminated; all operators may work at their maximum speed; the work of one operator cannot affect that of another; small orders may be produced economically; the eyestrain on operators is equalized; and the earnings of each operator will depend solely upon himself.

The foregoing advantages, and others that will hereinafter appear, adhere in the electric welding apparatus, constituting one specific embodiment of the invention, disclosed in the accompanying drawings and in the method of operation with the apparatus which is comprehended within the invention and described below in connection with the electric welding apparatus.

Figure 8:
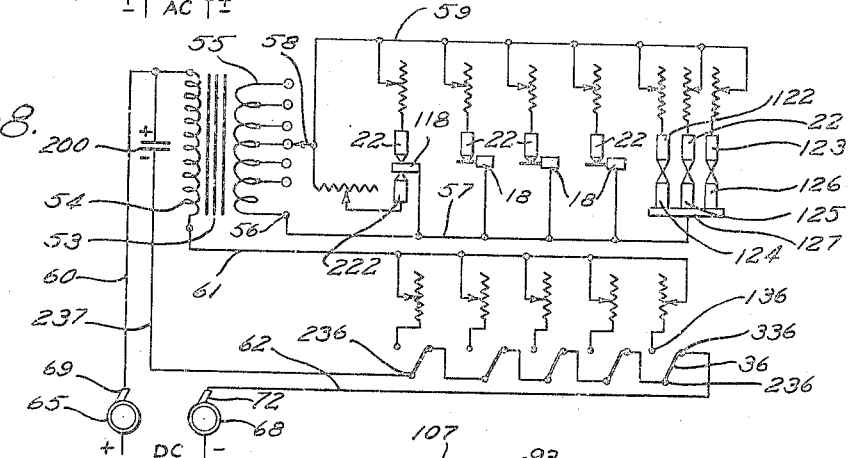
Figures 10, 11:
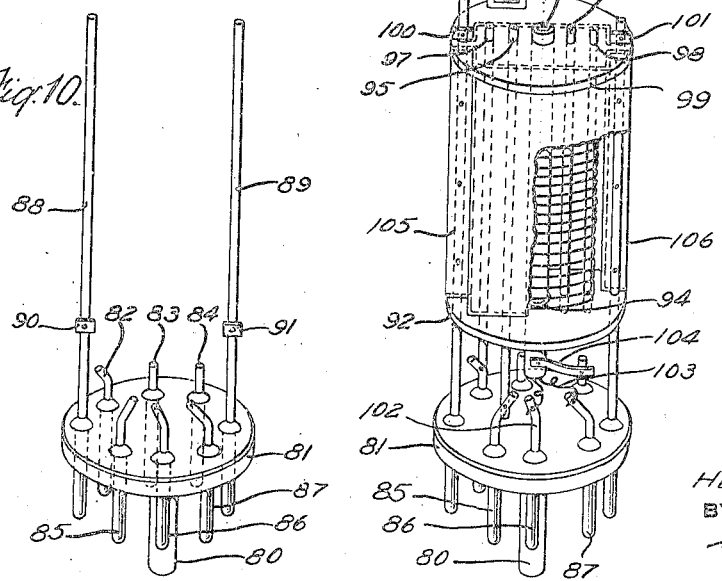

The drawings include:

Fig. 1 which is an elevation of the welding apparatus, partly in section;

Fig. 2 which is a top view of the welding table when equipped with five welding heads;

Fig. 3 which shows in perspective one of the eight similar operating mechanisms located on the underside of the work table, two pressure springs and their pull-bars having been omitted for clearness;

Fig. 4 which is a top view of the slip ring mechanism;

Fig. 5 which is a vertical section through that mechanism;

Fig. 6 which is a front elevation of a welding head, adapted for making three spot welds simultaneously;

Fig. 7 which is a wiring diagram showing the connections when the welding transformer is connected to alternating current;

Fig. 8 which is a wiring diagram showing the connections when the welding transformer is connected to an electric condenser with direct current supply;

Fig. 9 which is a section taken at A—A of Fig. 2, showing the insulation of the upper welding arm, and the variable resistance in the secondary circuit;

Fig. 10 which is a sketch of a common type of "stem" assembly;

Fig. 11 which is a sketch showing the construction of a common type of "mount," and is used to demonstrate the method of my invention. Small dots indicate spot welds.

In general, the welding apparatus illustrated in the drawings includes a rotatable table or turret A mounted on a standard B supported by a base C. The turret A carries five welding heads D1, D2, D3, D4 and D5, and is arranged to carry eight welding heads. The several welding heads are arranged to perform different operations and the number of welding heads mounted on the turret will depend upon the number of dissimilar operations to be performed. An operator seated at the turret moves the turret to bring the several welding heads in sequence to position in front of him and so may complete the welding operations in an assembly. The welding heads are individually operable.

For the purpose of provding a clearer understanding of the invention, an electric spot welding apparatus that is especially useful in assembling a "mount" for an electron tube has been illustrated. It will be appreciated, however, that the apparatus may be adapted and used for other purposes.

The base may be a circular, inverted, disc-shaped casting 1 having a circumambient radial flange 1a that rests upon the floor. To the base 1, there is rigidly secured a tubular upright 2 which at its lower end is threaded into the base. Another tubular member 3 surrounds the upright 2 and is rotatable with respect thereto. At its lower end the tubular member 3 bears on the base 1 and at its upper end against a ring 5 that is welded to the member 2.

A ring 6 having an outwardly extending flange 6a surrounds the tubular member 3. The ring 6 is adjustable up and down the tubular member 3 and may be secured in any adjusted position by clamping screws 7. This ring 6 has secured thereto a supporting plate 8. Eight foot pedals 9, angularly spaced about the axis of the standard are hinged at one end by hinges 9a to the supporting plate 8. At the opposite end, each foot pedal is pivotally secured to one end of an adjustable link 10, the other end of which is connected to the operating levers 11a and 11b through which a welding head is actuated. A spring 12, one for each foot pedal, which may be adjustable, provides the return action for the foot pedal.

A hollow casting 13 having a skirt 13a surrounding the tubular member 3 and secured thereto in any adjusted position by clamp screws 14 supports a table 15. The table 15 rests upon and is secured to an outwardly extending flange 13b on the casting 13. Preferably, the table 15 is made from aluminum or other non-magnetic material and may be covered with a sheet of "Duron" 16. Desirably, the table is shaped as shown in Fig. 2. It will be noted that the table 15, the casting 13, the tubular member 3 and the foot pedal supporting plate 8 are rigidly fastened together and are, as a unit, rotatable around the stationary upright 2.

The table 15 supports the welding heads D1, D2, D3, D4 and D5. There is considerable structure that is alike in the several welding heads, the heads differing primarily in their arrangements for making one or more welds and for making upper and lower welds. Because of this similarity in construction, the features of one welding head D1 will be described and thereafter the differences in the welding heads will be described. Like parts in the several welding heads will be given like numerals appropriately primed.

The welding head D1 includes a welder frame 17 that is fastened to the table and which is made from bronze, magnesium alloy or other suitable material. The table is arranged to support eight such frames, only five of which are illustrated. A removable, copper "tip-holder" 18 is secured in the necks of the frame 17 by means of screws 17a. This tip-holder 18 is adapted to receive a replaceable lower welding point 19.

An upper, movable welder arm 20, preferably made of magnesium alloy, is pivoted on a shaft 21. The shaft 21 is supported by bearings in the rear part of the frame 17. This welder arm 20 is insulated from the shaft 21 and the welder frame 17 (see Fig. 9) by an insulating bushing 20a and insulating side pieces 20b. The forward end of the arm 20 supports an upper welding point holder 22 which may be adjusted sideways to match up with the lower tip 19 and which is clamped in proper position by a screw 23. A replaceable welding point 24 is held in place in the holder 22 by screws 25.

The arm 20 is connected by an insulating link 26 to spaced pull-bars 27. The pull-bars 27 (see Fig. 3) extend downwardly, act as a unit and are normally held against a U-shaped piece 28 by a link 29, a spring 30 and a nut 31, threaded on the link 29. The spring 30 is a compression spring and acts between the nut 31 and the base or web of the U-shaped piece through which the link 29 extends and in which the link is slidable. The arms of the U-shaped piece 28 are pivotally connected to spaced lever arms 11a and 11b by pivot shafts 28a and 28b. A trip lever 32 is pivoted intermediate its ends between the pull-bars 27 by pivot pin 33, and at one end on a shaft 34 which is supported by an inverted U-shaped bracket 35 which is secured to the underside of the table 15. The ends of the lever arms 11a and 11b are also pivoted on the shaft 34. The free end of the trip lever 32 has a downward and lateral extension 32a that is positioned to engage and actuate the button 36a of a single pole, double throw, snap action switch 36 such as a "micro-switch" that is secured to one of the lever arms 11a.

This same construction and arrangement is utilized in actuating three welder arms such as are included in the welding head D3. The complete lever mechanism which is installed on the underside of the table beneath each of the eight welding positions, is shown in Fig. 6, the additional pull-rods and lever arms having been omitted from Fig. 3 for greater clearness. In the complete arrangement shown in Fig. 6, there are two additional lever arms 37' and 38', which extend, for a purpose that will hereinafter appear, beyond the inverted U-shaped bracket 35' corresponding to the bracket 35. These levers are pivoted on a pivot shaft 34' extending between the arms of the bracket 35'. At one end, the lever arm 37' extends between and is pivotally connected to spaced pull bars 41'. The lever arm 38' extends between and is pivoted to spaced pull bars 42'. The upper ends of the pull bars 41' are connected, through an insulating link to a welder arm 40, on one side of the welder arm 20' (corresponding to the welder arm 20 and connected to pull bars 27'), and the pull bars 42' are likewise connected to a welder arm 39 on the other side of the welder arm 20'. The three welder arms are mounted on a common shaft 121. At their lower ends, the pull bars 41' are connected to a link 43', extending through and slidable in the U-shaped bracket 28', and the pull bars 42' are in like manner connected to a similar link 44'. Springs 45' and 46' normally hold the pull bars 41' and 42' respectively against the cross bar of the U-shaped bracket 28'. Thus, when the lever arms 11a and 11b are actuated, the U-shaped bracket 28' is depressed, and the welding arms 20', 39 and 40 are actuated by or through the individual springs 30', 45' and 46' respectively. The lever 32' carries the extension for tripping the "micro-switch" and so controls the flow of current to the three welding arms.

The welding arms 39 and 40 may be off-set as shown in Fig. 2, or they may be identical in design to the arm 20'. At the other ends of the welder arms 39 and 40 there are mounted welding point holders 122 and 123 respectively. In a three arm head such as shown, lower welding point holders 124, 125 and 126 of the same kind as the upper holders may be mounted in a mandrel 127.

The welding head D4 is adapted to make a spot weld at the top and bottom of an article simultaneously. For this purpose, there are provided two lower welding arms 47 and 47a. These are identical in pattern to the welding arm 20" which is mounted between them. In such a case, the extensions of lever arms 37" and 38" are pivotally connected to a push rod 48 (see Fig. 1). Due to the pivotal connection to the shaft 34", the extensions move upwardly with a downward pull from the springs 45". The welding arms 47 and 47a are connected together at their outer ends by a cross member 147 to which a lower welding point holder 222 is secured. The push rod 48 is pivotally connected to the cross member 147.

From the foregoing, it will be seen that the welding head construction is such that any welding head may be readily changed from one form to another. This is important in changing over the machine from one assembly operation to another.

An adjustable arm rest 49 is provided in front of each welding position. These are desirably padded with felt 50 and covered with leatherette 51 or other suitable material. Metal enclosures, such as the enclosure 52, may conceal the working mechanism.

Current for the welding may desirably be supplied through a slip ring mechanism such as illustrated in Figs. 4 and 5. In this arrangement, a fiber disc 63 is fastened by the screws 64 to the ring 5, which is welded to the stationary tubular member 2. To this fiber disc 63 are fastened brass slip rings 65, 66, 67 and 68, each insulated from the others. Bearing on said rings, respectively, are brushes 69, 70, 71 and 72 which are secured at their outer ends to brass terminal blocks 73, 74, 75 and 76, the latter being mounted on a fiber ring 77. The fiber ring 77 is fastened to the steel ring 4 which is welded to the movable tubular member 3. Wires 78, 79, 80 and 81 are brought in from the outside, either through the floor or through the holes 82 in the base 1, said holes being tapped for ½" conduit. Two of the wires may be used for transmitting current to the primary of the welding transformer, the other pair may be used for lighting or for the control of a timing device which may be placed remote from the machine, if desired. This slip ring mechanism may be eliminated if a suitable stop is provided so that the table can be revolved only through one complete turn, in which case it is necessary to reverse the rotation in order to return the table to the starting position. With such an arrangement, the welding current may be brought in through flexible cables, either from below, through the hollow support member, or from a suitable outlet placed above the welding machine.

The welding transformer is located in a pocket in casting 13 and consists of the laminated core 53, the primary winding 54, and the secondary winding 55. The electrical connections are as follows: In the diagram, Fig. 7, the transformer, variable resistances, relay, condenser, slip rings and "micro-switches" have been indicated in the conventional manner. Referring to Fig. 7, one of the lines of the alternating current supply is brought in through the slip ring 65, the brush 69, the wire 169, the normally closed relay contacts 269, and the wire 60 to the primary winding 54. The other supply line is brought in through the slip ring 68, brush 72, and the wire 62 to the common terminals 236 of all the micro-switches. The normally open contacts 136 of all the micro-switches are connected through the variable rheostat 161 and the wire 61 to the primary winding 54. The relay coil 270 is connected so that it will be thrown across the A. C. line whenever any one of the micro-switches 36 is closed; thus, it is seen that when any micro-switch 36 is closed, the transformer will be exited and the relay contacts 269 will open. There is an inherent time delay of a fraction of a second in the operation of the relay, depending on its design, thus the current flows for that time.

One terminal 56 of the secondary wiring 55 is connected by the copper straps 57 to all of the base castings 17. A suitable tap 58 on said secondary 55 is connected to a rectangular copper bus bar 259 and thence by the flexible cables 59 and the variable resistances 159 (see Fig. 9) to all of the movable arms on all the welder frames.

Thus it is evident that when any micro-switch 56 is closed by the movement of the foot pedal, the transformer will be excited and current will flow through the welding points which correspond to that particular micro-switch, all the other welding points naturally being open. This current will flow until its cut off by the opening of relay contacts 269.

Where an impulse source of alternating current is available, that is, a supply which is automatically "on" for say two cycles and then "off" for say two cycles, and so on, then the relay is not used. In that case, the operator can control the time of the weld accurately enough with her foot. The reason for this is that the weld cools off between impulses and it will not burn even if the operator allows the current to flow for three or four impulses. Many factories making electronic tubes are supplied with impulse current.

When manufacturing very small tubes of the "hearing aid" type, no larger than the end of an ordinary lead pencil, the condenser discharge method of welding is often desirable. Fig. 8 shows a new and economical method of employing a condenser. The positive line of the direct current supply is brought in through the slip ring 65, the brush 69, and the wire 60 to one terminal of the primary winding 54; also to the positive terminal of the condenser 200. (Polarity must be observed if electrolitic condensers are used.) The negative side of the D. C. supply is brought in through the slip ring 68, brush 72, wire 72, wire 62 to the normally closed contact 336 of one "micro-switch" 36, to the common terminal 236 and in a similar way, through all the "micro-switches" to the common terminal 236 of the last "micro-switch," thence through the wire 237 to the negative terminal of the condenser 200. All the normally open contacts 136 of the "micro-switches" 36 are connected through variable rheostats, and the wire 61 to the primary winding 54 of the welding transformer. The secondary circuit of said transformer is the same as shown in Fig. 7.

From the foregoing it will be evident that the condenser remains on charge between welds, but when any foot-pedal is depressed, the corresponding "micro-switch" will be actuated, the normally open contact in said switch will close with snap action, and the condenser will discharge through the primary winding of the welding transformer. This will induce a current in the secondary winding, said current flowing through the welding points corresponding to the particular foot-pedal which has been depressed.

Referring to Figs. 1 and 3, the operation of a single welding head is as follows: The operator first inserts the parts to be welded between the welding points 19 and 24, which are held apart by spring 12. The foot pedal 9 is then depressed. The movement of the foot pedal is transmitted to the lever arms 11a and 11b, which are pivoted at 34. Since the U piece 28 is hung on the lever arms 11a and 11b by the shafts 28a and 28b this downward motion of said levers 11a and 11b is transmitted to the pull-bars 27 which are held against said U piece 28 by the compression of the spring 30. Thus the welder arm 20 is lowered by the movement of the foot pedal 9 until the welding point 24 touches the work piece to be welded. When the welding point strikes the work, the arm 20 can move no further, the pull bars 27 remain stationary, also the trip lever 32, which is connected to said pull-bars by the pin 33. However, a further movement of the foot pedal 9 will move the levers 11a and 11b and the U piece 28 downward, compressing the spring 30 and moving said U piece away from the pull-bars 27. Since the micro-switch 36 is carried by the lever arm 11a, and since the trip lever 32 remains stationary, it is clear that said further movement of lever 11a and switch 36 will actuate the contact button 36a of the micro-switch 36. Said action initiates the welding current, and it can only occur after pressure has been applied at the spot to be welded.

It should be noted that, even if the length of the welding point 24 is shortened by filing or otherwise, nevertheless, the welding current will only be initiated when the pressure spring 30 has been compressed a definite predetermined amount. Furthermore, it should be noted that if the micro-switch is also used to interrupt the welding current, said interruption will always take place before the pressure at the weld has been removed.

The micro-switch 36 is of the single pole, double throw type, with a quick make and break, and it requires only a small fraction of an ounce of pressure to operate. When used on alternating current, only the single throw, "normally open" contacts are used; when used on direct current, the double throw contacts are used; the normally open contacts for discharging the condenser, the normally closed contacts for charging the condenser.

The operation of the welding equipment as a whole, when welding a typical "mount" assembly, is described as follows: The welding heads are selected, adjusted and located on the table top in such a manner that the welding operations will follow in proper sequence.

The operator grasps the edge of the table, and rotates it so as to bring the welding machine which is suitable for the first operation into working position. The operator then picks up a stem assembly (Fig. 10) from the table at the left of the welder. This stem assembly consists of a glass exhaust tube 80, fused to a glass button 81, in which have been sealed the "lead-in" wires 82, 83, 84, 85, 86 and 87, and the plate supports 88 and 89. To said plate supports 88—89, the operator then welds the stops 90—91. From the bin, conveniently located above the welding heads, the operator picks a mica disc 92 in which has been assembled a nickel cathode tube 93. (This assembly has been done in the "parts" department, where an operator inserts the cathode tube into the disc until an extruded ring 94 strikes the disc and then welds onto the end of the tube a ribbon 104 which prevents the disc from falling off the tube and provides a connection for welding to a lead-in wire. A heater element is inserted in the cathode tube 93, the ends 102 and 103 of said heater element projecting through the bottom of the cathode tube.)

The operator places this disc assembly onto the plate supports 88—89 until it rests against the stops 90—91.

The operator then picks up an inner grid assembly which consists of two supporting legs 95—96, to which has been crimped a helix of fine wire. The operator places this grid assembly around the cathode tube, with the grid supports 95—96 projecting through the mica disc 92. In a similar manner the operator assembles the outer grid.

The operator then slips a mica disc 99 over the plate supports 88, 89, over the grid legs 95, 96, 97 and 98, and over the cathode tube 93. The stops 100, 101 are then welded to the plate supports 88, 89. This holds the assembly together, and the operator places it in a rack at the right of the welding head. These operations may be repeated until some fifty assemblies have been placed in said rack.

The operator then rotates the table to the left until the welding heads required for the next operations are brought into working position. For the particular type of "mount" described, two welding heads are required, in the second work position. On one of these machines are welded the heater wires 102, 103 to the lead-in wires 86, 87. On the other machine is welded the cathode ribbon 104 to the lead-in wire 84. These operations are repeated until all the assemblies which were in a rack at the left of the welders have been placed in a rack at the right of the welders.

The operator then rotates the table to the left until the next welding machine is brought into working position. On this machine are welded the inner grid leg 95 to the lead-in wire 85, and the outer grid leg 97 to the lead-in wire 82. When these operations have been completed, and the assemblies shifted to a rack at the right of the welder, the table is again rotated to the left. This rotation brings into working position a three-point welder and a single point welder. On the three point welder are welded the two plate halves 105, 106 to the plate supports 88, 89. Three welds are accomplished simultaneously through the two plates, and the plate supports. On the single point welder, the getter 107 is welded to the plate support 88. This completes the "mount" assembly. "Lead-in" wire 83 is not used in this type "mount."

Toward the end of the work day, the operator may reduce the number of "mounts" which are in process at one time to about five or ten, so that at the closing hour there will be no unfinished "mounts."

For the particular type of "mount" described above, the following welder layout was required:

1st position

Single point welder, adjusted for welding a stop to a plate support.

2nd position

Two single point welders, one adapted for welding the heater wires to the "lead-in" wires, the other adapted for welding a cathode ribbon to a "lead-in" wire.

3rd position

Single point welder adapted for welding a grid leg to a "lead-in" wire.

4th position

Three point welder for welding the plate halves to the plate supports, and a single point welder for welding the getter to the plate support.

Welding machine layouts, differing from that described above, may be required for welding "mounts" of various design. For example, the two grids in the mount illustrated, might have their legs made out of different material. One set of legs might be made of copper, the other set might be made of chromium-copper alloy. In that case, two single point welders would be used in the third position.

Or, a one piece cylindrical plate might be used instead of the two half plates. With such a design an "up and down" welder would be required in the second position and the three point welder omitted in the fourth position.

In fact, there are innumerable layouts which may be employed, using up to eight heads with suitable welder arm arrangement, and equipped with welding points of various shape and material.

It will be obvious that various changes may be made by those skilled in the art in the details of the apparatus disclosed in the drawing and described above and in the steps of the method described above within the principle and scope of the invention as expressed in the appended claims.

I claim:

1. Electric welding apparatus of the kind described comprising in combination a rotatable central support member, a welding transformer located on the support member, a work table secured to said support member, a plurality of welding heads located on said work table, a lower support plate secured to said central support member, and a plurality of foot pedals secured to said support plate, one for each welding head, the corresponding foot pedals and welding heads being operatively connected together and movable as a unit.

2. An electric spot welding head comprising in combination a plurality of movable welder arms, welding point holders carried by said welder arms, and means for actuating the welder arms including an operating lever, and a resilient connection between each of said welder arms and the operating lever.

3. An electric spot welding head comprising in combination stationary welding points, a plurality of cooperating movable welding points, and means for actuating the movable welding points including an operating lever, and a resilient connection between each of said movable welding points and the operating lever.

4. An electric spot welding head comprising in combination stationary welding points, a plurality of cooperating movable welding points, and means for actuating the movable welding points including an operating lever, and a resilient connection between each of said movable welding points and the operating lever and means for initiating the weld upon a predetermined compression of one of said resilient connections.

5. A convertible welding head of the kind described comprising in combination a frame member having provision for removably supporting several welding point holders, a welder arm movably mounted on said frame member, means for actuating said movable welding arm including an operating lever, a plurality of pull rods resiliently connected to said operating lever, means connecting one of said pull rods to said movably mounted welder arms, and means for connecting said additional pull rods to other movable welder arms mounted on the frame.

6. An electric spot welding head comprising in combination a stationary welding point holder, a plurality of movable welder arms, means for actuating the movable welder arms including an operating lever, and an independent, adjustable, resilient connection between each of said movable welder arms and said operating lever.

HENRY S. HOLMES.

REFERENCES CITED

The following references are of record in the file of this patent:

UNITED STATES PATENTS

| Number | Name | Date |
|---|---|---|
| 647,694 | Burton | Apr. 17, 1900 |
| 1,168,346 | Thomson | Jan. 18, 1916 |
| 1,351,717 | Ledwinka | Aug. 31, 1920 |
| 1,579,721 | Leslie | Apr. 6, 1926 |
| 1,728,616 | Kondahjian | Sept. 17, 1929 |
| 1,988,537 | Brequet | Jan. 22, 1935 |
| 2,009,647 | Brusse et al. | July 30, 1935 |
| 2,039,857 | Vetorino | May 5, 1936 |
| 2,115,827 | Powell | May 3, 1938 |
| 2,130,657 | Wathin | Sept. 20, 1938 |
| 2,265,270 | Dawson | Dec. 9, 1941 |
| 2,304,021 | Rippl | Dec. 1, 1942 |

FOREIGN PATENTS

| Number | Country | Date |
|---|---|---|
| 426,319 | Great Britain | June 27, 1933 |
| 519,353 | Great Britain | Mar. 21, 1940 |
| 703,455 | Germany | Mar. 10, 1941 |